2 Sheets—Sheet 1.

L. F. BETTS.

Assignor of two-thirds to the R. E. DIETZ COMPANY and the STEAM GAUGE AND LANTERN COMPANY.

TUBULAR LANTERN.

No. 11,127. Reissued Nov. 25, 1890.

Witnesses:
Theo. L. Popp.
Chester D. Howe

Lewis F. Betts, Inventor.
By Edward Wilhelm
Attorney.

THE NORRIS PETERS CO., PHOTO-LITHO., WASHINGTON, D. C.

2 Sheets—Sheet 2.

L. F. BETTS.

Assignor of two-thirds to the R. E. DIETZ COMPANY and the STEAM GAUGE AND LANTERN COMPANY.

TUBULAR LANTERN.

No. 11,127. Reissued Nov. 25, 1890.

Witnesses:
Theo. L. Popp.
Chester D. Howe.

Lewis F. Betts, Inventor.
By Edward Wilhelm
Attorney.

THE NORRIS PETERS CO., PHOTO-LITHO., WASHINGTON, D. C.

UNITED STATES PATENT OFFICE.

LEWIS F. BETTS, OF NEW YORK, N. Y., ASSIGNOR OF TWO-THIRDS TO THE R. E. DIETZ COMPANY, OF SAME PLACE, AND THE STEAM GAUGE AND LANTERN COMPANY, OF SYRACUSE, NEW YORK.

TUBULAR LANTERN.

SPECIFICATION forming part of Reissued Letters Patent No. 11,127, dated November 25, 1890.

Original No. 397,625, dated February 12, 1889. Application for reissue filed November 18, 1889. Serial No. 330,823.

*To all whom it may concern:*

Be it known that I, LEWIS F. BETTS, of New York city, in the county and State of New York, have invented certain new and useful Improvements in Tubular Lanterns, of which the following is a full, clear, and exact description, reference being had to the accompanying drawings, and to the letters of reference marked thereon.

My invention has relation to lanterns or lamps of that class commonly known as "tubular" lanterns or "tubular" lamps, and wherein air for the support of combustion is carried from a point above the flame down to the under side of the burner-cone through suitable tubes provided for the purpose.

The objects of my invention are the provision of a simple and efficient guard for the globe; also, the provision of cheap and durable means for holding the globe on the perforated base-plate upon which it rests; also, the provision of simple and efficient means for holding the perforated base-plate and guard in place in the lantern.

My invention consists to these ends of the improvements in the construction of the parts, which will be hereinafter fully set forth, and pointed out in the claims.

Figure 1:
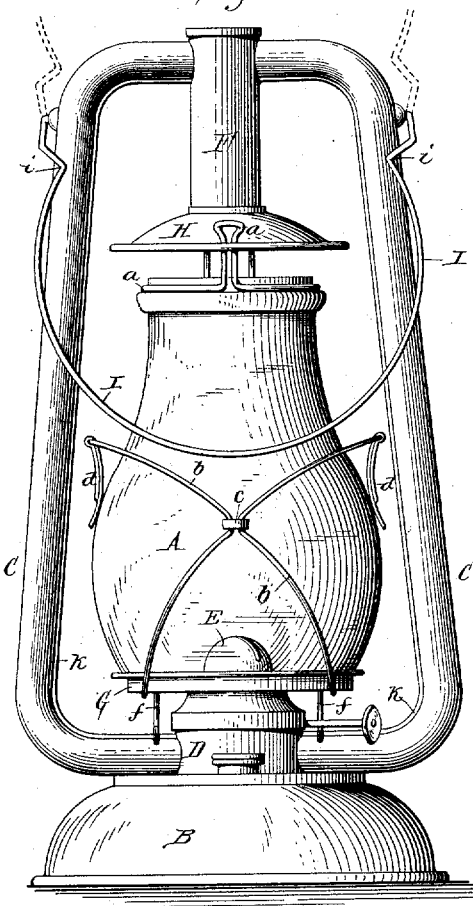
Figure 2:
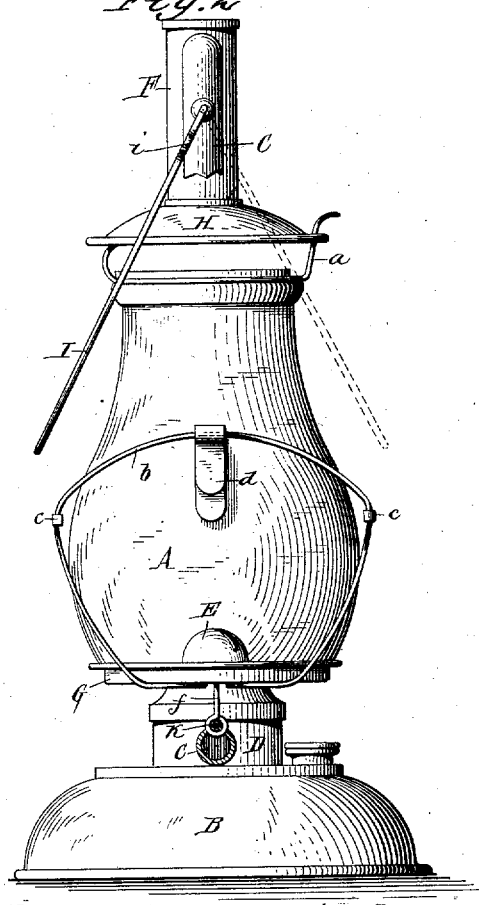
Figure 4:
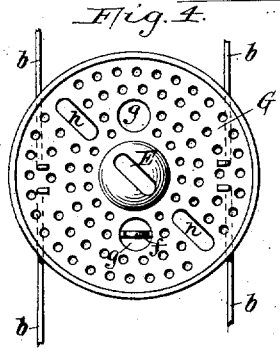
Figure 3:
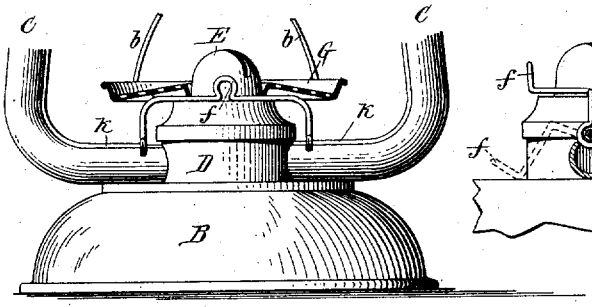
Figure 5:
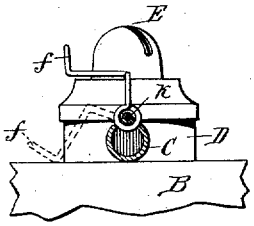
Figure 6:
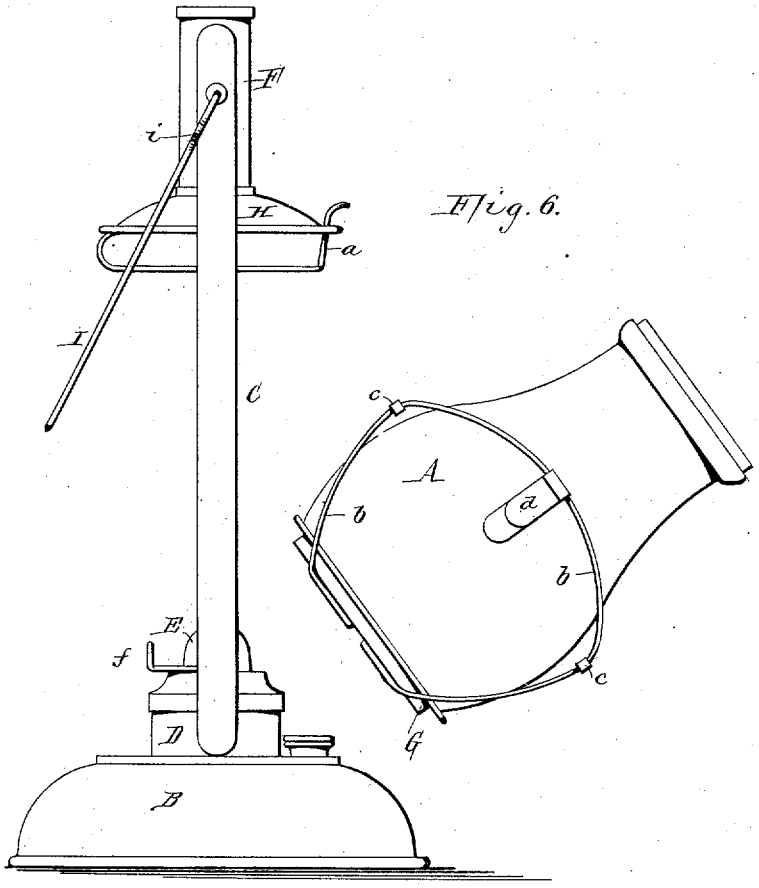
Figure 7:
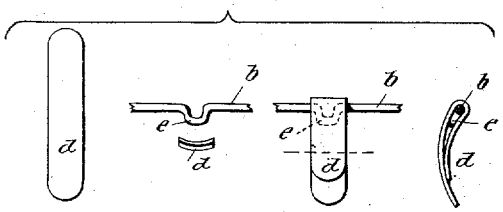

In the accompanying drawings, consisting of two sheets, Figure 1 is an elevation of a lantern provided with my improvement. Fig. 2 is an elevation at right angles to Fig. 1 with one of the tubes broken away. Fig. 3 is an elevation of the lower portion of the lantern with the base-plate in section. Fig. 4 is a top plan view of the perforated base-plate and connecting parts. Fig. 5 is a side elevation of the air-chamber and burner with one of the tubes broken away. Fig. 6 is a side elevation of the lantern, showing the globe, base-plate, and guard detached from the lantern-frame. Fig. 7 represents in one group the blank from which the globe-holders or bearing-pieces are made and the manner of uniting them with the guard-wires, so as to afford the requisite strength and rigidity.

Like letters of reference refer to like parts in the several figures.

A represents the globe; B, the oil-pot; C C, the air-conducting tubes leading down to the air-chamber D; E, the burner-cone mounted on the air-chamber D, and F the central air-pipe communicating at its upper end with the tubes C C.

G is the perforated base-plate upon which the globe rests, and which in turn rests upon the burner-cone E. As shown in the drawings, this plate is not hinged or otherwise attached to the lantern structure, but can be entirely removed therefrom. The globe and base-plate are held in position by a spring-clasp *a*, attached to the dome or bell H and bearing upon the upper end of the globe. When this spring is elevated, the globe may be removed from the lantern for cleaning the globe and for lighting, trimming, &c.

*b b* represent two guard-wires, which are secured to the base-plate G. These wires are each constructed in the form of a bow, which encircles one-half of the globe, and the lower ends of which are secured to the base-plate. The lower portions of the two guard-wires or bows on the same side of the globe approach each other as they ascend from the base-plate, and are secured together at their point of contact by a clip *c* or other suitable fastening, and then recede from each other above this fastening and pass around the globe, so that the upper receding portion of each bow is connected with its lower portions by return-bends, whereby each bow is stiffened, and the clips are applied to the return-bends, whereby the clips are prevented from slipping on the wires. The upwardly-converging lower portions of the two guard-wires are arranged, respectively, on the front and rear sides of the lantern, and the upper portions of the guard-wires, which encircle the globe, extend from the front to the rear side of the lantern on the inner sides of the tubes. The clips *c* may be constructed of flat metal or wire, and may be soldered in place, if desired.

To hold the globe on the base-plate the guard-wires are provided with projections or bearing-pieces *d d*, which are attached to the upper portions of the guard-wires on the inner sides of the tubes and which bear upon the globe above its largest part or greatest swell. These bearing-pieces are stamped or cut out of any small scraps of tin for economy and are bent over the guard-wires. To make the union with the guard-wires strong and effective I bend or crimp the guard-wires, as shown in Fig. 7, and lap the strips *d* over these bends, afterward securing the parts by solder, which may be conveniently applied by dipping. The strips are slightly concaved to conform to the curvature of the globe and better hold the same. The globe is seated upon the base-plate by forcing it down between the bearing-pieces *d d*, the guard-wires yielding sufficiently for the purpose when the globe and base-plate are connected, so that they may be removed and replaced together. The globe may be removed from the base-plate, if desired, by springing the bearing-pieces or guard-wires apart; but that will seldom be found necessary.

The guard and the tubes effectually protect the globe against damage. The points where the guard-wires approach each other should be located between the tubes or on the front and rear sides of the lantern, and to facilitate this location I utilize the cone lock or catch *f* as a gage or guide. The perforated base-plate G is provided on diametrically-opposite sides with two openings *g g*, which are so arranged that the upwardly-projecting end or finger-piece of the catch can enter one of the perforations.

In Fig. 5 the catch is shown in its locked position in full lines and in its unlocked position in dotted lines. When the catch is in its locked position and the perforated plate is so placed that one of its openings *g* receives the end of the catch, the base-plate and guard will be properly arranged with respect to the tubes.

The elongated perforations *h h* in the base-plate are for the purpose of admitting a match for lighting, but may be omitted.

I is the bail or handle hinged in some convenient manner upon the tubes C and arranged to turn toward either side. To prevent it from coming in contact with the globe, the bail is bent inwardly at points near the hinges, as at *i i*, and these bent portions are arranged to bear against the tubes C C and hold the bail away from the globe.

It is desirable to lock the cone in place in such manner that while it may be detached when required it cannot be accidentally detached, and I therefore provide the hinge lock or catch *f*. This is made of wire and is hinged below the cone to the lower branches of the air-tubes, each of which is provided on its upper side with a seam or bead *k*. By suitably perforating the blanks for the tubes before they are seamed or beaded up the hooked ends of the wire *f* may be inserted through the perforations, as indicated in Fig. 5, when the beading will form a strong and durable hinge-axis. The catch, when in place, bears upon a ledge on the cone and holds it to its seat. When it is desired to detach the cone, the guide is turned down to the position indicated by dotted lines in Fig. 5.

I make no claim herein to guard-wires which are crossed, such a construction being shown in a prior patent, No. 384,821, granted to me June 19, 1888.

I claim as my invention—

1. The combination, with the globe-supporting plate, of a guard composed of bows secured with their lower ends to said plate, each bow having its lower portions extending obliquely from the plate to the opposite bow and having its upper receding portion connected with its lower portions by return bends, the adjacent return-bends of two bows being secured together, substantially as set forth.

2. In a lantern, the combination, with the guard-wires, of the metal bearing pieces or projections bent upon and secured to the wires and arranged to bear against the globe, substantially as and for the purposes set forth.

3. In a lantern, the combination, with the globe and removable base-plate connected therewith and bearing the guard-wires, of the bent-wire catch provided with the gage passing through an aperture in the base-plate, substantially as shown, and for the purposes set forth.

Witness my hand this 23d day of September, 1889.

LEWIS F. BETTS.

Witnesses:
NEIL J. CONSIDINE,
C. L. BROWNE.